No. 758,805. Patented May 3, 1904.

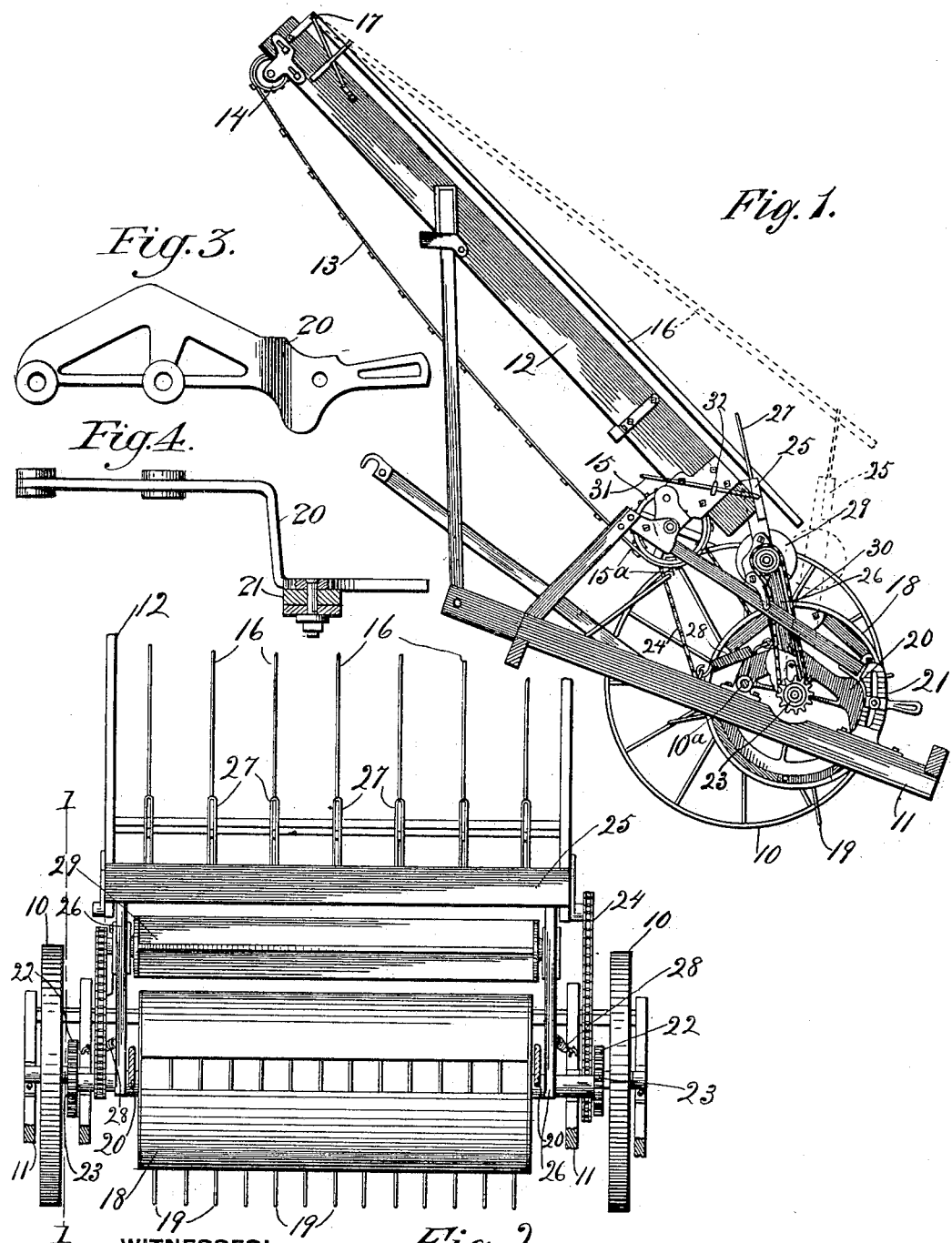

UNITED STATES PATENT OFFICE.

HENRY A. ADAMS, OF SANDWICH, ILLINOIS.

HAY-LOADER.

SPECIFICATION forming part of Letters Patent No. 758,805, dated May 3, 1904.

Application filed August 7, 1903. Serial No. 168,607. (No model.)

*To all whom it may concern:*

Be it known that I, HENRY A. ADAMS, a citizen of the United States, and a resident of Sandwich, county of Dekalb, and State of Illinois, have invented certain new and useful Improvements in Hay-Loaders, of which the following is a specification and which are illustrated in the accompanying drawings, forming a part thereof.

The invention relates to that type of hay-loaders in which there is employed an inclined elevator and a rotating drum carrying rake or gathering teeth which raise the hay to the conveyer of the elevator; and its object is to provide yieldable means for guiding the hay to the bottom of the carrier.

The invention consists of the parts and arrangement of parts, as hereinafter described and as illustrated in the accompanying drawings, in which—

Figure 1 is a detail side elevation, some of the parts being shown in section, taken on the line 1 1 of Fig. 2, certain gear-wheels being omitted for the purpose of clearness. Fig. 2 is a detail rear elevation of the same, partly in section.

I have not deemed it necessary to show the internal construction of the drum or the details of some other parts of the machine not having any bearing upon the present invention.

A pair of carrying-wheels is shown at 10 10, and a frame 11 is mounted upon the axle thereof and supports the inclined elevator-frame 12. An endless carrier or conveyer 13 turns over sheaves or rollers 14 15 at the top and bottom, respectively, of the elevator-frame, and a plurality of wind-guards or guide-slats 16 are pivoted, as indicated at 17, at the top of the elevator-frame and rest loosely upon the carrier, as is usual in machines of this type.

The hay is gathered from the ground by means of a drum 18, having projecting teeth 19 and being journaled in a frame 20, swinging about the axle of the drive-wheels 10 and adjustably engaged by a bracket 21, rising from the frame 11. The drum is rotated by means of a pair of spur-gears 22 22, fixed on the axle of the drive-wheels and intermeshing with pinions 23 23, mounted upon the drum-shaft.

The carrier 13 is driven by means of a sprocket-chain 24, turning about suitable sprocket-wheels, one on the axle of the drive-wheels and one on the shaft of the drum 15, and this drum is provided with spurs $15^a$, which engage the hay as it is raised by the teeth 19.

A beater 29, pivoted in arms 26 26, supported by and swinging about the shaft of the drum 18, coöperates with the spurred drum 15 to raise the hay to the receiving end of the elevator. The beater 29 is driven in the same direction of rotation as the drum 18, so as to prevent the hay from following the surface of the latter and hold it against the drum 15. Immediately above the beater 29 is located a backboard 25, also secured to the arms 26 and serving to prevent the hay from following over the beater and to bear it against the lower end of the carrier.

The beater 29 is driven by a sprocket-chain 30, turning over suitable wheels mounted upon the shaft of the beater and of the drum 18, respectively.

The beater and backboard are drawn forward toward the elevator by springs 28, secured to the frame 11 and the arms 26, so that they may yieldingly press against the hay as it is raised, thus providing an expansible throat and coöperating with the drum 15 with equal efficiency though the density of the hay may greatly vary.

Machines of this type operate most satisfactorily when the throat is so contracted that the material passes it under some slight pressure. If the throat is too large, the hay will not be raised by the spurs of the drum 15 until it has been bunched sufficiently to fill it. If it be too contracted, the material rises under excessive pressure and at the expense of increased draft. It has therefore been the practice to adjust either the beater-frame or the carrier so as to adapt the throat of the machine to the average density of the crop. In those parts of the field where the crop was either lighter or heavier than the average the machine would necessarily do its work at a disadvantage.

In the machine as herein shown and described the beater-frame automatically adapts itself to the condition of the crop, providing a uniform pressure of the hay against the elevating-drum, and hence a constant feed to the elevator.

Loops 27 rise from the backboard 25, the slats 16 passing loosely through them and being thus held against lateral movement and limited in their upward movement.

A stop for limiting the backward movement of the beater-frame is provided consisting of a rod 31, pivotally attached to the frame and sliding through an eye 32, attached to the elevator-frame.

I claim as my invention—

1. In a hay-loader, in combination, an elevator, means for feeding material to the elevator, means for holding the material upon the elevator, and a frame independent of the feeding means, oscillatable to and from the receiving end of the elevator.

2. In a hay-loader, in combination, an elevator, rakes for raising the material to the elevator, means for holding the material upon the elevator, and a frame independent of the rakes, oscillatable to and from the receiving end of the elevator.

3. In a hay-loader, in combination, an elevator, a rotating rake-head, a swinging guide-frame pivoted concentrically with the rake-head, and a spring holding the frame toward the base of the elevator.

4. In a hay-loader, in combination, an elevator, a rotating rake-head, a swinging frame pivoted concentrically with the rake-head, a spring holding the frame toward the base of the elevator, and a rotary beater and a guide-board both carried by the frame.

5. In a hay-loader, in combination, an elevator, a rotating rake-head, a swinging guide-frame pivoted concentrically with the rake-head, a spring holding the frame toward the base of the elevator, oscillating guide-slats over the elevator, and loops secured to the guide-frame and through which the slats pass.

6. In a hay-loader, in combination, an elevator, means for feeding material to the elevator, a swinging frame for directing the material to the receiving end of the elevator, and a stop for limiting the backward movement of the frame.

7. In a hay-loader, in combination, an elevator, a raking-drum having projecting teeth, a carrier-drum having spurs, a yielding frame swinging about the axis of the raking-drum, means for holding the frame toward the carrier-drum, a rotatable beater carried by the frame and turning in the same direction as the raking-drum and sweeping the face thereof, and a guide-board located above the beater, substantially as described.

8. In a hay-loader, in combination, an elevator, a spurred rotatable drum at the base of the elevator, a yieldable frame bearing toward the drum, and means for delivering hay to the throat between the drum and the frame.

9. In a hay-loader, in combination, an elevator, a spurred rotatable drum at the base of the elevator, a yieldable frame bearing toward the drum, a rotatable member carried by the frame and coacting with the drum to raise the hay, and means for feeding the hay to the throat between the drum and such rotatable member.

10. In a hay-loader, in combination, an elevator, means for holding the material upon the elevator, a yieldable frame bearing against the receiving end of the elevator, and means for delivering hay to the throat between the receiving end of the elevator and the frame.

HENRY A. ADAMS.

Witnesses:
C. L. STINSON,
C. C. JONES.